Nov. 5, 1940.                C. S. LOMBARDI                2,220,532
              HEATING DEVICE FOR DOMESTIC AND OTHER USES
                    Filed Jan. 27, 1938         2 Sheets-Sheet 1

Inventor,
C. Strappa Lombardi
By: Glascock Downing & Seebold
Attys.

Nov. 5, 1940.  C. S. LOMBARDI  2,220,532
HEATING DEVICE FOR DOMESTIC AND OTHER USES
Filed Jan. 27, 1938  2 Sheets-Sheet 2

Inventor
C. Strappa Lombardi
By: Glascock Downing + Seebold, Attys.

Patented Nov. 5, 1940

2,220,532

UNITED STATES PATENT OFFICE 2,220,532

HEATING DEVICE FOR DOMESTIC AND OTHER USES

Caffiero Strappa Lombardi, Santiago, Chile

Application January 27, 1938, Serial No. 187,277
In Chile June 17, 1937

2 Claims. (Cl. 126—214)

This invention refers to heating devices for domestic and other uses.

Hitherto heat has been generally used in its many forms of adoption for domestic use and others, by placing the utensil or object to be heated directly on the heat source or burner, originating thereby considerable losses on account of the low heat transmission efficiency of such apparatus.

Taking for instance, the case of a gas burner and the like, working in the best possible manner for obtaining complete combustion, applied to a utensil or other object, it is easy to observe the surrounding air currents produced, and of the total heat provided by combustion only a small part is utilized in heating the utensil and the rest is lost by radiation, conduction, and by the escape of the hot burnt gases which are rapidly carried away by said currents.

Amongst other defects which the ordinary heating apparatus presents, the following may be mentioned: The operator receives directly on the face and hands the hot gas currents, which also heat up the handles and lugs of the utensils, and the noxious products of combustion are inhaled by the operator, exposing him to all kinds of hurtful results. Also these gases or combustion products with their high temperature are diffused in the surrounding air.

In order to prevent in great part such heat losses and the inconveniences which generally occur with the use of kitchen ranges, stoves and the like, I have invented an economizing chamber, which may be applied without difficulty to apparatus of common use, the advantages of which may be appreciated from the following description.

The present invention refers to a system of construction of an economizing apparatus or chamber designed for obtaining a better utilization and distribution of the heat energy generated from a heat producing source whereby a reduction is obtained in fuel consumption.

In order that the invention may be more clearly understood and by way of example, I describe hereinbelow an apparatus constructed in accordance with the present system of heat utilization, applied to a gas stove. Such an apparatus is illustrated in the accompanying drawings, in which:

Figure 3 shows diagrammatically a shutter or diaphragm adapted for adjustment round the utensil to be heated; and Figure 4 illustrates a ring shaped slotted plate connected to the shutter for the purpose of adjusting the central opening of the shutter to the periphery of the utensil to be heated in a manner hereinafter described.

Figure 1:
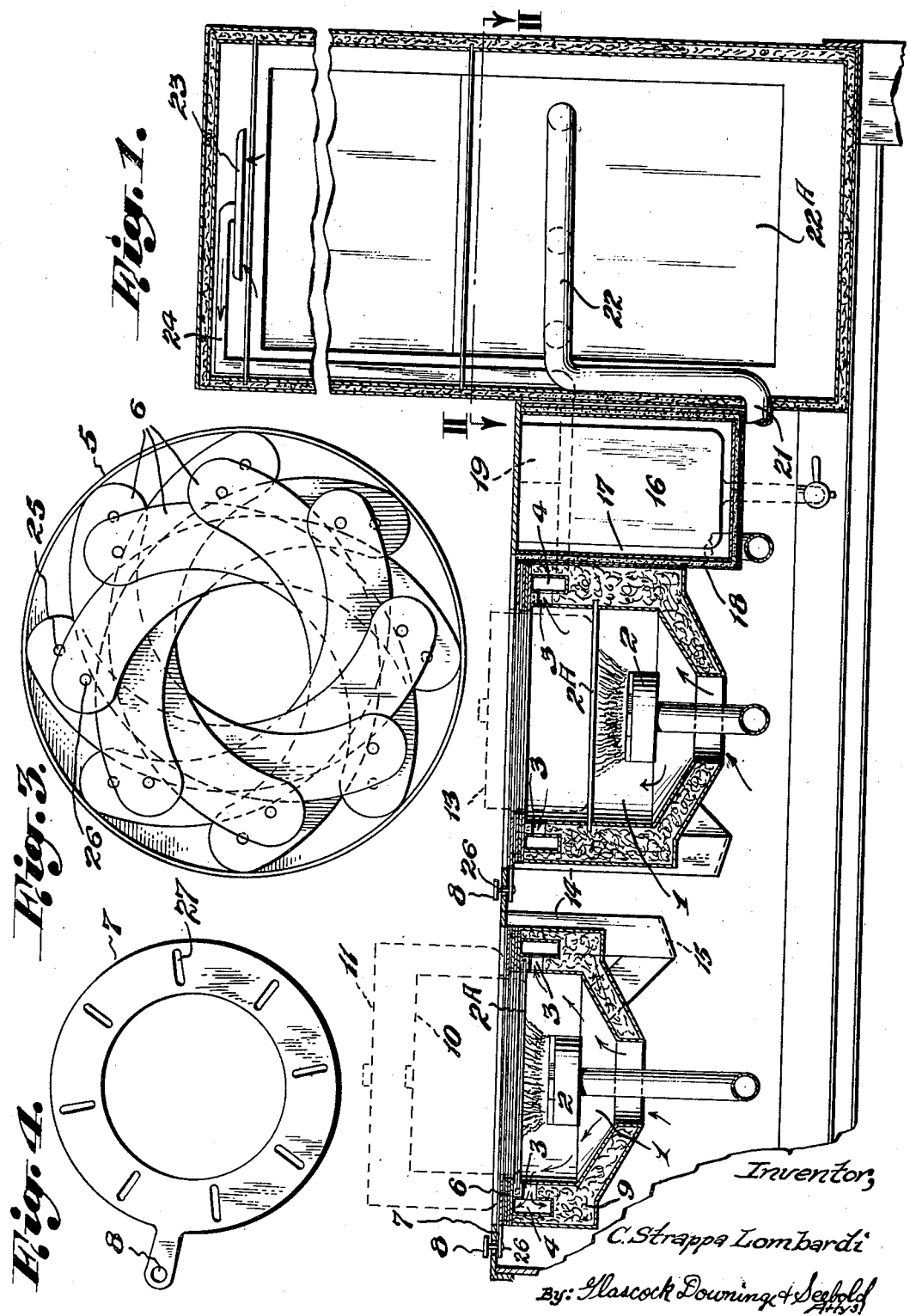
Figure 1 is a vertical sectional view, of a gas stove with the economizing device, taken along the line I—I of Figure 2.
Figure 2:
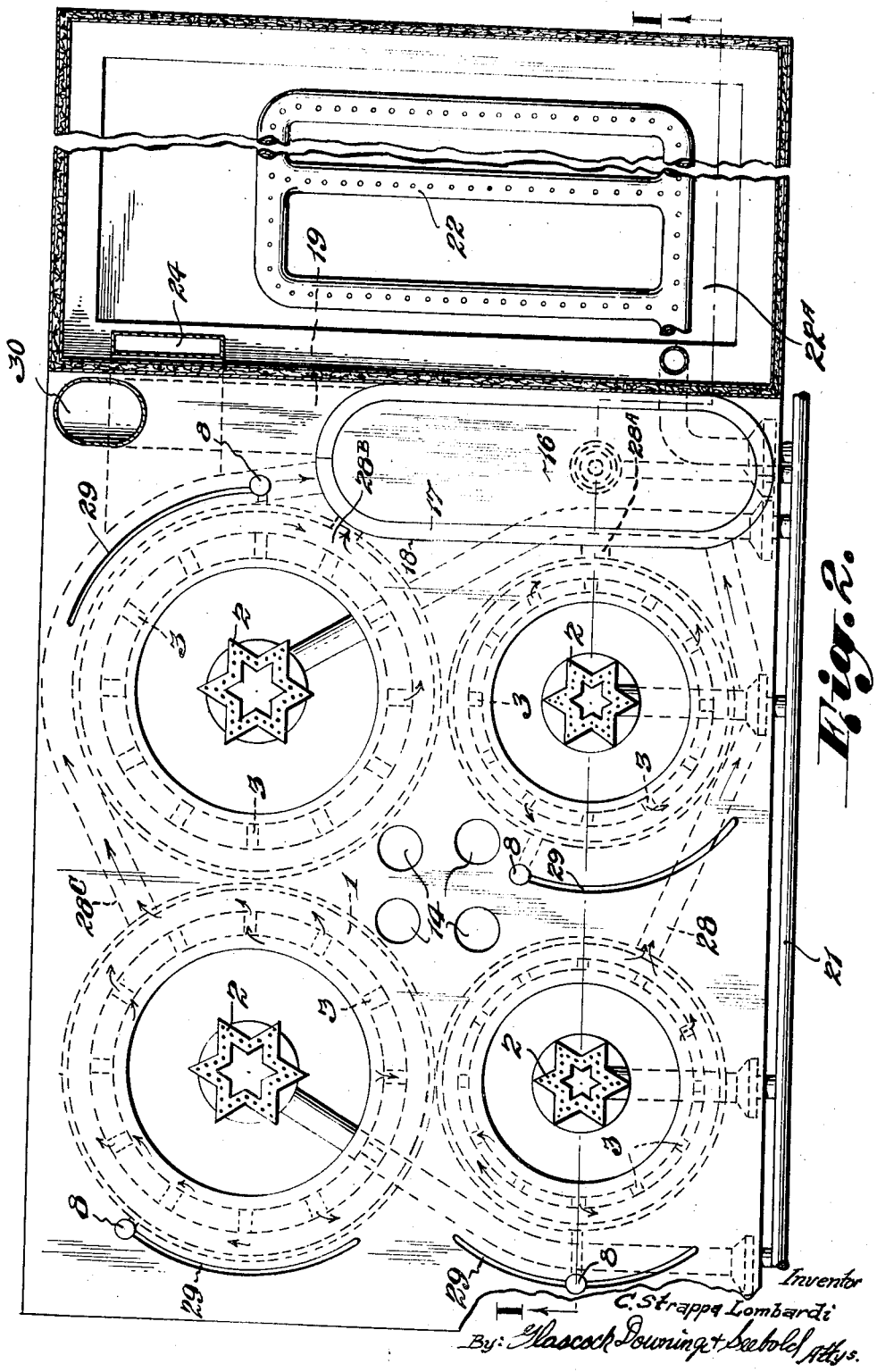
Figure 2 is a plan view partly in section, through line II—II in Figure 1, of the same apparatus.

In the drawings, I are the economizing chambers, inside which are located the stove burners 2 and grates 2A for supporting the utensils; 3 are radial apertures in the inside periphery of said chambers that lead to annular collecting ducts 4 into which flow the burnt gases from said chambers. 10 and 11 indicate in dotted lines the positions which utensils will take when placed over the burner of an economizing chamber, the diameter of which is smaller than those of said utensils, or when the shape of the utensils should require their being placed on the outside of the chamber as in the case of pans, or large pots. With this object the grate 2A is located near the top of the chamber, above the apertures 3, and between the utensil and the grate the shutter plates 6 are adjusted to make a closed covering which will prevent the escape of the burnt gases. In the case of utensils smaller in diameter than the chamber cavity, they are wholly or partly introduced in the chamber as happens with the pot shown at 13 in dotted lines. The supporting grate and burner have then a lower position inside the chamber, and the space remaining between the utensil and the inside wall of the chamber serves as a passage for the burnt gases which pass through radial apertures 3 into the collecting duct 4 as in the former case. Observation holes 14 with mirrors 15 are provided with the necessary apertures for observing by reflexion the fuel flames from the burners. The burnt gases leaving the chamber through apertures 3 after passing to the collecting circular ducts 4 go to ducts 28, 28A, 28B and 28C and to the heating chamber 17 inside which a water tank 16 is centrally located. Gas is supplied to the stove burners through a pipe 21, which also supplies burner 22 of an oven 22A. 23 is a collector for the burnt gases of this oven, which are led to the water tank heating chamber 17 through duct 24. Finally the burnt gases after having given up a great portion of their heat are led to the discharge channel 19 and chimney 30 into the atmosphere.

The slotted plate ring 7 shown in Figure 4 is provided with a vertical handle 8 which passes through the circular slot 29 in the stove plate for guiding said handle in its circular motion, which is required for the adjustment of the shutters around the periphery of the utensils placed on the stove.

The shutter illustrated diagrammatically in Fig. 3 is of a well-known type, composed of a series of curved plates 6 shaped and located so as to form a central aperture approximately circular in shape. Those curved plates are provided with pins 26 which slide in slots 27 of the circular ring plate 7, and with the circular motion imparted to this plate by means of the handle 8 a relative motion of curved plates 6 is obtained which increases or decreases the diameter of said central aperture so that the utensil placed on the stove may be closely adjusted to said plates so as to substantially cover the space between the chamber and utensil and prevent the escape to the atmosphere of the hot gases of combustion. The above described shutter or diaphragm, of well known construction, has been adopted for convenience with the present apparatus, but any other types of shutting or covering arrangement, such as ordinary stove rings of convenient size may be used for the purpose and no claim is made in the present application for the construction of the adjustable shutter per se.

The economizing chambers are made of or lined with insulating material and are of sufficient thickness for the formation of the gas collecting circular ducts of ample size. The hot gases circulating through these ducts will effectually reduce the losses of heat by conduction. Ducts 28, 28A, 28B and 28C are preferably made of non-oxidizing metal tubing.

From the above description it will be understood that the economizing chamber of the present invention is of simple construction and easily applicable to all kinds of stoves and other heating apparatus.

In actual tests made with an apparatus constructed in accordance with the present invention, an economy up to 30% in fuel consumption, as compared with ordinary cooking stoves, has been obtained.

Having now particularly described and ascertained the nature of my said invention and in what manner the same is to be performed, I declare that what I claim is:

1. In a gas stove, a gas burner, a radially apertured housing surrounding the burner so as to provide a chamber therearound, an annular conduit arranged around the housing to receive gas and excess heat from the chamber through the radial apertures, means adapted to provide a support for articles to be heated by the burner, and adjustable means to prevent the escape of hot gases from the chamber around the article.

2. In a gas stove, a gas burner, a radially apertured housing surrounding the burner so as to provide a chamber therearound, an annular conduit arranged around the housing to receive gas and excess heat from the chamber through the radial apertures, means within the housing for supporting an article to be heated, a series of overlapping plates arranged to provide a central opening over the burner, and means for moving said plates so as to vary the size of the central opening.

CAFFIERO STRAPPA LOMBARDI.